United States Patent
Miyazaki

(10) Patent No.: US 8,979,276 B2
(45) Date of Patent: Mar. 17, 2015

(54) ROTARY WHEEL, LIGHT SOURCE UNIT, PROJECTOR AND ROTARY WHEEL FABRICATION METHOD

(75) Inventor: Takeshi Miyazaki, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 200 days.

(21) Appl. No.: 13/559,910

(22) Filed: Jul. 27, 2012

(65) Prior Publication Data
US 2013/0027671 A1    Jan. 31, 2013

(30) Foreign Application Priority Data

Jul. 28, 2011  (JP) .................................. 2011-165258
Jul. 20, 2012  (JP) .................................. 2012-161785

(51) Int. Cl.
| | | |
|---|---|---|
| G03B 21/14 | (2006.01) | |
| F21V 9/16 | (2006.01) | |
| G03B 21/20 | (2006.01) | |
| F16F 15/32 | (2006.01) | |
| G02B 26/00 | (2006.01) | |

(52) U.S. Cl.
CPC ............ *G03B 21/204* (2013.01); *F16F 15/324* (2013.01); *G02B 26/008* (2013.01)
USPC .............................................. 353/84; 362/84

(58) Field of Classification Search
CPC . H04N 9/3197; H04N 9/3117; H04N 9/3114; G03B 21/204; F21S 10/007; G02B 26/008
USPC ......... 353/84, 30, 31; 359/885–892; 348/743; 362/84
See application file for complete search history.

(56) References Cited

U.S. PATENT DOCUMENTS

2005/0109154 A1* 5/2005 Chang ..................... 74/573 R
2010/0328617 A1* 12/2010 Masuda ..................... 353/31

FOREIGN PATENT DOCUMENTS

JP         2004-197922 A        7/2004

* cited by examiner

*Primary Examiner* — William C Dowling
*Assistant Examiner* — Ryan Howard
(74) *Attorney, Agent, or Firm* — Holtz, Holtz, Goodman & Chick PC

(57) ABSTRACT

There is provided a circular disc-shaped rotary wheel comprising a luminescent light emitting area in which a luminescent material is provided along a circumferential edge of the circular disc shape, an annular step portion which is formed at a different level from a reference plane which is a surface where the luminescent light emitting area is formed, and a balance correction material which is placed at the annular step portion, wherein the balance correction material is placed at the annular step portion so as to even a rotational balance when the rotary wheel is rotated.

16 Claims, 8 Drawing Sheets

ROTARY WHEEL, LIGHT SOURCE UNIT, PROJECTOR AND ROTARY WHEEL FABRICATION METHOD

CROSS-REFERENCE TO RELATED APPLICATIONS

This application is based upon and claims the benefit of priority under 35 USC 119 of Japanese Patent Application No. 2011-165258 filed on Jul. 28, 2011 and Japanese Patent Application No. 2012-161785 filed on Jul. 20, 2012, the entire disclosures of which, including the description, claims, drawings and abstracts, are incorporated herein by reference.

BACKGROUND OF THE INVENTION

1. Field of the Invention

The present invention relates to a rotary wheel, a light source unit, a projector and a rotary wheel fabrication method.

2. Description of the Related Art

In these days, data projectors are used on many occasions as image projection units which project images including images of screens of personal computers and video images, as well as images based on image data which are stored in memory cards on to a screen. In these projectors, light emitted from a light source is collected on to a micromirror display element called a digital micromirror device (DMD) or a liquid crystal panel for projection of color images on to a screen.

Additionally, in association with propagation of personal computers and audio equipment such as DVD players and the like, such projectors have been finding a variety of applications from use for business presentations to domestic use. Conventionally, the mainstream of these projectors has been those which utilize a high-intensity discharge lamp as a light source. In recent years, however, there have been made many developments and proposals on data projectors which use, as a light source, a semiconductor light emitting diode such as a laser diode.

For example, there are proposed a light source unit which includes an excitation light source which employs laser diodes to emit light of blue wavelength band and a luminescent wheel (a rotary plate) which has a luminescent material layer adapted to absorb light emitted from the excitation light source to transform the excitation light into visible light and which is driven to rotate by a motor and a projector which employs this light source unit.

Japanese Unexamined Patent Application No. 2004-197922 (Patent Literature 1) discloses a vibration preventive system for suppressing the vibration of a rotary disc such as a color wheel by evening the weight balance of the rotary disc when it is rotating in which a curable liquid is accommodated in a dish-like vessel which is provided on the rotary disc so as to eliminate vibrations of the rotary disc in an effective fashion.

In the proposal described in Patent Literature 1, however, there is provided a member made up of a hub which is a dish-like vessel and to which the color wheel is connected at a distal end of a rotary shaft, and an adhesive is injected onto the hub. According to this configuration, the number of components involved is increased, and the number of fabrication steps is also increased, leading to an increase in fabrication costs.

Additionally, according to the configuration in which the hub is so provided, in disposing a lens unit which is made up of a collective lens which collects excitation light to an excitation light source side of the color wheel efficiently and other lenses, spaces for the lens unit and the hub have to be ensured, leading to a problem that the light source unit and hence the projector are enlarged in size.

SUMMARY OF THE INVENTION

According to the invention, there is provided a rotary wheel having a circular disc shape, comprising
a luminescent light emitting area in which a luminescent material is provided along a circumferential edge of the circular disc shape;
an annular step portion which is formed at a different level from a reference plane which is a surface where the luminescent light emitting area is formed; and
a balance correction material which is placed at the annular step portion, wherein
the balance correction material is placed at the annular step portion so as to even a rotational balance when the rotary wheel is rotated.

Additionally, according to the invention, there is provided a light source unit comprising:
the rotary wheel of the invention;
an excitation light source which shines light on to the rotary wheel; and
a wheel motor which is connected to the rotary wheel to rotate the rotary wheel.

In addition, according to the invention, there is provided a projector comprising:
a light source unit;
a display element;
a light source side optical system which guides light from the light source unit to the display element;
a projection side optical system which projects an image emitted from the display element on to a screen; and
a projector control unit which controls the light source unit and the display element, wherein
the light source unit is the light source unit of the invention which comprises, as a plurality of light sources, a light source which emits light of red wavelength band, a light source which emits light of blue wavelength band and a light source which emits light of green wavelength band.

Additionally, according to the invention, there is provided a rotary wheel fabrication method for forming a base plate into a circular disc shape through mechanical work, wherein
the rotary wheel comprises:
a luminescent light emitting area in which a luminescent material is provided along a circumferential edge of the circular disc shape;
an annular step portion which is formed at a different level from a reference level which is a surface where the luminescent light emitting area of the rotary wheel is formed; and
a balance correction material which is placed at the annular step portion, and wherein
the annular step portion is formed when the base plate is formed into the circular disc shape through mechanical work.

Additionally, according to the invention, there is provided a rotary wheel fabrication method for forming a thin metallic base plate into a circular disc shape through mechanical work, wherein
the rotary wheel comprises:
a luminescent light emitting area in which a luminescent material is provided along a circumferential edge of the circular disc shape;
an annular step portion which is formed at a different level from a reference plane which is a surface where the luminescent light emitting area of the rotary wheel is formed; and a balance correction material which is placed at the annular step portion, and wherein the annular step portion is formed by bending the rotary wheel by a predetermine angle relative to the reference plane which is the surface where the luminescent light emitting area of the rotary wheel is formed when the base plate is formed into the circular disc shape through mechanical work.

Advantages of the invention will be set forth in a description which will follow and will in part be obvious from the description or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate an embodiment of the invention and serve to explain the principles of the invention together with the general description given above and the detailed description of the embodiment given below.

DETAILED DESCRIPTION OF THE PREFERRED EMBODIMENT

An embodiment of the invention will be described by reference to the drawings.

Figure 1:
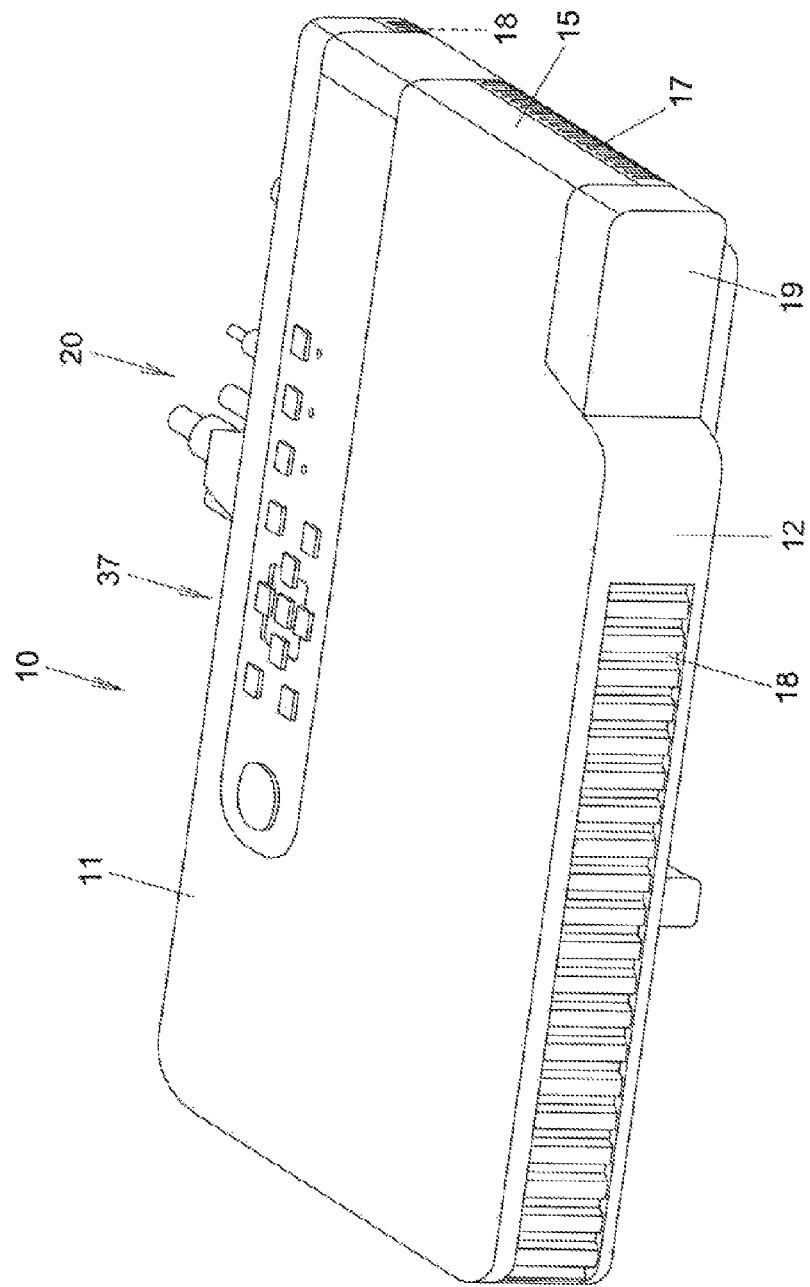
FIG. 1 is a perspective view showing an external appearance of a projector according to an embodiment of the invention.

Hereinafter, an embodiment of the invention will be described in detail by reference to the drawings. FIG. 1 is a perspective view showing an external appearance of a projector 10. When referred to in this embodiment, left and right with respect to the projector 10 denote, respectively, left and right directions with respect to an image projecting direction, and front and rear denote, respectively, front or forward and rear and rearward directions with respect to a direction towards a screen and a traveling direction of a pencil of light which is emitted from the projector 10 towards the screen.

Then, as is shown in FIG. 1, the projector 10 has a substantially rectangular parallelepiped shape. The projector 10 has a lens cover 19 which covers a projection opening which is disposed to a side of a front side panel 12 which is referred to as a front panel of a projector casing. A plurality of outside air inlet ports 18 are formed in the front side panel 12. Further, although not shown, the projector 10 includes an Ir reception unit which receives a control signal from a remote controller.

In addition, a keys/indicators unit 37 is provided on an upper side panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display element, a control circuit or the like overheats.

Further, USB terminals, an image signal input D-SUB terminal into which analog RGB image signals are inputted, an S terminal and an RCA terminal are provided on aback side panel which is situated on a back side of the projector casing. Further, an input/output connector unit where an audio output terminal and the like are provided and various types of terminals 20 including a power supply adaptor plug are provided on the back side of the projector casing. Additionally, a plurality of outside air inlet ports are formed in the backside panel. In addition, pluralities of inside air outlet ports 17 are formed in a right-hand side panel which is a lateral side panel of the projector casing which is not shown and a left-hand side panel 15 which is a lateral side panel shown in FIG. 1. Further, outside air inlet ports 18 are also formed in a corner position of the left side panel 15 which is in the vicinity of the back side panel.

Figure 2:
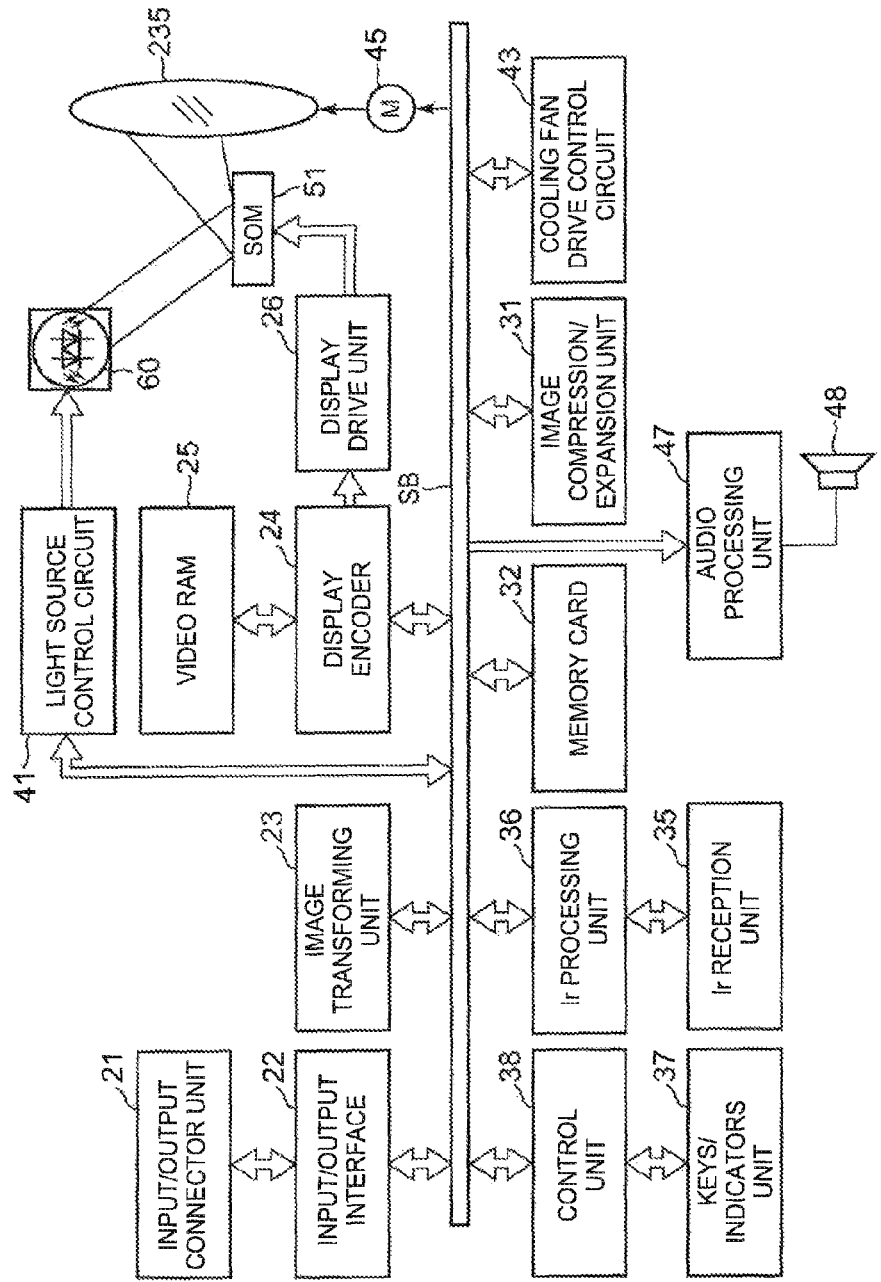
FIG. 2 is a functional block diagram of the projector according to the embodiment of the invention.

Next, a projector control unit of the projector 10 will be described by use of a functional block diagram shown in FIG. 2. The projector control unit includes a control unit 38, an input/output interface 22, an image transforming unit 23, a display encoder 24, a display drive unit 26 and the like.

The control unit 38 governs the control of respective operations of circuitries within the projector 10 and is made up of a CPU, a ROM which stores in a fixed fashion operation programs of various types of settings and a RAM which is used as a work memory.

Then, image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display by the projector control unit. Thereafter, the image signals of various standards which are so transformed are outputted to the display encoder 24.

Additionally, the display encoder 24 deploys the image signals that have been inputted thereinto on a video RAM 25 for storage therein and thereafter generates a video signal from the contents stored in the video RAM 25, outputting the video signal so generated to the display drive unit 26.

The display drive unit 26 functions as a display element control unit and drives a display element 51 which is a spatial optical modulator (SOM) at an appropriate frame rate in response to the image signal outputted from the display encoder 24. A pencil of light which is emitted from a light source unit 60 is shone onto the display element 51 via a light source side optical system 170. Then, in this projector 10, an optical image is formed by reflected light reflected by the display element 51 and the image so formed is then projected on to a screen, not shown, for display thereon via a projection side optical system 220. In addition, a movable lens group 235 of the projection side optical system is driven by a lens motor 45 for zooming or focusing.

In addition, an image compression/expansion unit 31 performs a recording operation in which a luminance signal and a color difference signal of an image signal are data compressed through such processes as ADCT and Huffman coding, and the compressed data is sequentially written on a memory card 32 which is configured as a detachable recording medium.

Further, when in a reproducing mode, the image compression/expansion unit 31 reads out the image data recorded on the memory card 32 and expands individual image data which make up a series of dynamic images frame by frame. Then, the image data is outputted to the display encoder 24 via the image transforming unit 23 so as to perform a process which enables the display of dynamic images based on the image data stored on the memory card 32.

Operation signals generated at the keys/indicators unit 37 which is made up of the main keys and indicators provided on the upper side panel 11 of the projector casing are sent out directly to the control unit 38. Additionally, key operation signals from the remote controller are received by the Ir reception unit 35, and a code signal demodulated at an Ir processing unit 36 is outputted to the control unit 38.

In addition, an audio processing unit 47 is connected to the control unit 38 via the system bus (SB). This audio processing unit 47 includes a circuitry for a sound source such as a PCM sound source. When in a projection mode and a reproducing mode, the audio processing unit 47 converts audio data into analog signals and drives a speaker 48 to output loudly sound or voice based on the audio data.

In addition, the control unit 38 controls a light source control circuit 41 which is configured as a light source control unit. This light source control circuit 41 controls individually the emission of light of a red light source device, a green light source device and a blue light source device of the light source unit 60 so that light of a predetermined wavelength band which is required when an image is generated is emitted from the light source unit 60.

Further, the control unit 38 causes a cooling fan drive control circuit 43 to detect temperatures through a plurality of temperature sensors which are provided in the light source unit 60, so as to control the rotating speed of a cooling fan based on the results of the temperature detection. Additionally, the control unit 38 also causes the cooling fan drive control circuit 43 to make the cooling fan continue to rotate even after the power supply to a projector main body is switched off by use of a timer or the like. In addition, the control unit 38 causes the cooling fan drive control circuit 43 to make the power supply to the projector main body be cut off depending upon the results of the temperature detection by the temperature sensors.

Figure 3:
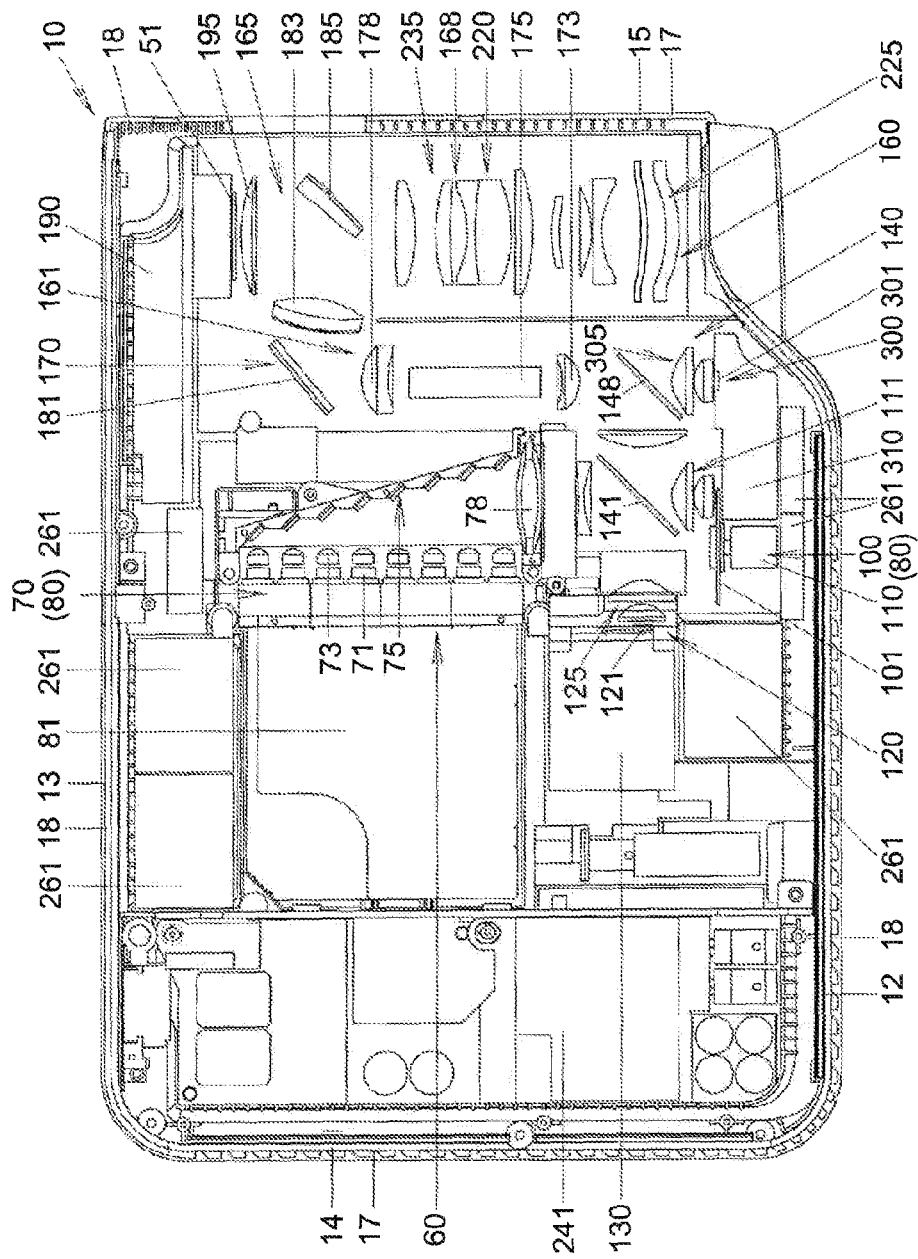
FIG. 3 is an exemplary plan view showing an internal construction of the projector according to the embodiment of the invention.

Next, an internal construction of the projector 10 will be described. FIG. 3 is an exemplary plan view showing an internal construction of the projector 10. As shown in FIG. 3, the projector 10 includes a control circuit board 241 in the vicinity of the right side panel 14. This control circuit board 241 includes a power supply circuit block, a light source control block and the like. Additionally, the projector 10 includes the light source unit 60 which is provided to a side of the control circuit board 241, that is, at a substantially central portion of the projector casing. Further, the projector 10 includes an optical system unit 160 between the light source unit 60 and the left side panel 15.

The light source unit 60 includes an excitation light shining device 70 which is disposed at a substantially transversely central portion of the projector casing and in proximity to the back side panel 13. Further, the light source unit 60 includes a green light source device 80 which is a luminescent light emitting device 100 which is disposed on an optical axis of a pencil of light which is emitted from the excitation light shining device 70 and in the vicinity of the front side panel 12. Further, the light source unit 60 includes a blue light source device 300 which is disposed in the vicinity of the front side panel 12 so as to be parallel to a pencil of light which is emitted from the luminescent light emitting device 100. Furthermore, the light source unit 60 includes a red light source device 120 which is disposed between the excitation light shining device 70 and the luminescent light emitting device 100. In addition, the light source unit 60 includes further a light guiding optical system 140 which turns the directions of optical axes of light emitted from the luminescent light emitting device 100, light emitted from the red light source device 120 and light emitted from the blue light source device 300 so that the optical axes of the light of different colors emitted from the luminescent light emitting device 100 and the light source devices 120, 300 are collected to the same optical axis so as to be guided to a predetermined plane which is an entrance port of a light tunnel 175.

The excitation light shining device 70 in the green light source device 80 includes excitation light sources 71 of semiconductor light emitting elements which are disposed so that optical axes thereof are parallel to the back side panel 13. Further, the excitation light shining device 70 includes a group of reflection mirrors 75 which turns an optical axis of light emitted from the excitation light sources 71 by 90 degrees in the direction of the front side panel 12. Furthermore, the excitation light shining device 70 includes a collective lens 78 which collects light emitted from the excitation light sources 71 and reflected by the group of reflection mirrors 75. Further, the excitation light shining device 70 includes a heat sink 81 which is disposed between the excitation light sources 71 and the right side panel 14.

The excitation light sources 71 are arranged into a matrix of a total of 24 blue laser diodes which are arranged in three rows and eight columns. Collimator lenses 73 are individually disposed on optical axes of the blue laser diodes. Each of the collective lenses 73 transform light emitted from each of the blue laser diodes into parallel light. In addition, the group of reflection mirrors 75 is configured so that a plurality of reflection mirrors are individually arranged like constituting a steps-shape as shown in the FIG. 3 and reduces sectional areas of pencils of light which are emitted from the excitation light sources 71 in one direction for collection to a collective lens 78.

A cooling fan 261 is disposed between the heat sink 81 and the back side panel 13. The excitation light sources 71 are cooled by the cooling fan 261 and the heat sink 81. Further, a cooling fan 261 is also disposed between the group of reflection mirrors 75 and the back side panel 13. The group of reflection mirrors 75 and the collective lens 78 are cooled by this cooling fan 261.

The luminescent light emitting device 100 which is the green light source device 80 is disposed so as to be parallel to the front side panel 12. The luminescent light emitting device 100 includes a luminescent wheel 101 which is a rotary wheel which is disposed so as to be at right angle to the optical axis of light which is emitted from the excitation light shining device 70. Further, the luminescent light emitting device 100 includes a wheel motor 110 which rotationally drives the luminescent wheel 101. Furthermore, the luminescent light emitting device 100 includes a group of collective lenses 111 which collects pencils of luminescent light which are emitted from the luminescent wheel 101 in the direction of the back-side panel 13.

The luminescent wheel 101 is a metallic base material having a circular disc shape. An annular luminescent light emitting area is formed on the luminescent wheel 101. This annular luminescent light emitting area receives light emitted from the excitation light sources 71 as excitation light and emits luminescent light of green wavelength band. Thus, the luminescent wheel 101 functions as a luminescent plate which receives excitation light to emit luminescent light. In addition, a surface including the luminescent light emitting area of a side of the luminescent wheel 101 which faces the excitation light sources 71 is mirror finished through silver deposition so as to be formed into a reflection surface which reflects light. A layer of a green luminescent material is laid on this reflection surface.

Then, light emitted from the excitation light shining device 70 and shone on to the green luminescent material layer on the luminescent wheel 101 excites a green luminescent material in the green luminescent material layer. Pencils of luminescent light which are emitted in every direction from the green luminescent material are emitted directly towards the excitation light sources 71 or are reflected on the reflection surface of the luminescent wheel 101 so as to be eventually emitted towards the excitation light sources 71.

In addition, excitation light which passes through the luminescent material layer to be shone on to the metallic base material without being absorbed by the luminescent material in the luminescent material layer is reflected by the reflection surface to enter the luminescent material layer again to thereby excite the luminescent material. Thus, by making the surface of the luminescent wheel 101 into the reflection surface, the efficiency of utilization of excitation light emitted from the excitation light sources 71 which are green light sources can be enhanced, so that brighter luminescent light can be emitted from the luminescent wheel 101.

In the excitation light which is reflected on the reflection surface of the luminescent wheel 101 towards the luminescent material layer, excitation light which is emitted towards the excitation light sources 71 without being absorbed by the luminescent material passes through a first dichroic mirror 141, which will be described later, and luminescent light is reflected by the first dichroic mirror 141. Therefore, excitation light is emitted to the outside of the projector 10 in no case. Then, a cooling fan 261 is disposed between the wheel motor 110 and the front side panel 12, and the luminescent wheel 101 is cooled by this cooling fan 261. The construction of the luminescent wheel 101 and a construction for stabilizing the rotational balance of the luminescent wheel 101 will be described later.

The red light source device 120 includes a red light source 121 which is disposed so that an optical axis thereof is parallel to the excitation light sources 71. The red light source device 120 includes further a group of collective lenses 125 which collects light emitted from the red light source 121. The red light source device 120 is disposed so that the optical axis thereof intersects the optical axis of light emitted from the excitation light shining device 70 and the optical axis of luminescent light of green wavelength band which is emitted from the luminescent wheel 101.

Additionally, the red light source 121 is a red light emitting diode which is a semiconductor light emitting element which emits light of red wavelength band. Further, the red light source device 120 includes a heat sink 130 which is disposed on a side of the red light source 121 which faces the right side panel 14. In addition, a cooling fan 261 is disposed between the heat sink 130 and the front side panel 12, and the red light source 121 is cooled by this cooling fan 261.

The blue light source device 300 includes a blue light source 301 which is disposed so that an optical axis thereof is parallel to the optical axis of light emitted from the luminescent light emitting device 100. Further, the blue light source device 300 includes a group of collective lenses 305 which collects light emitted from the blue light source 301. Additionally, the blue light source device 300 is disposed so that the optical axis thereof intersects the optical axis of light emitted from the red light source device 120. The blue light source 301 is a blue light emitting diode which is a semiconductor light emitting element which emits light of blue wavelength band. Further, the blue light source device 300 includes a heat sink 310 which is disposed on aside of the blue light source 301 which faces the front side panel 12. In addition, a cooling fan 261 is disposed between the heat sink 310 and the front side panel 12, and the blue light source 301 is cooled by this cooling fan 261.

The light guiding optical system 140 includes collective lenses which collect pencils of light of red, green and blue wavelength bands and dichroic mirrors which turn the directions of optical axes of the pencils of light of red, green and blue wavelength bands to direct them to the same optical axis.

Specifically speaking, in the light guiding optical system 140, the first dichroic mirror 141 is disposed in a position where the optical axes of light of blue wavelength band which is emitted from the excitation light shining device 70 and light of green wavelength band which is emitted from the luminescent wheel 101 intersect the optical axis of light of red wavelength band which emitted from the red light source device 120. This first dichroic mirror 141 transmits light of blue and red wavelength bands and reflects light of green wavelength band to turn the direction of the optical axis of the green light by 90 degrees towards the left side panel 15.

In addition, in the light guiding optical system 140, a second dichroic mirror 148 is disposed in a position where the optical axis of light of blue wavelength band which is emitted from the blue light source device 300 intersects the optical axis of light of red wavelength band which is emitted from the red light source device 120. This second dichroic mirror 148 transmits light of blue wavelength band and reflects light of green and red wavelength bands by 90 degrees towards the back side panel 13. Additionally, a collective lens is disposed between the first dichroic mirror 141 and the second dichroic mirror 148. Further, a collective lens 173 is disposed in proximity to the light tunnel 175. This collective lens 173 collects light source light to the entrance port of the light tunnel 175.

The optical system unit 160 includes an illumination side block 161 which is positioned to a left-hand side of the excitation light shining device 70. Further, the optical system unit 160 includes an image generating block 165 which is positioned in proximity to a position where the back side panel 13 intersects the left side panel 15. Furthermore, the optical system unit 160 includes a projection side block 168 which is positioned between the light guiding optical system 140 and the left side panel 15. Thus, the optical system unit 160 is configured into a substantially U-shape by these three blocks.

The illumination side block 161 includes part of a light source side optical system 170 which guides light source light emitted from the light source unit 60 to the display element 51 that is possessed by the image generating block 165. Included as the light source side optical system 170 that the illumination side block 161 possesses are the light tunnel 175 which transforms a pencil of light emitted from the light source unit 60 into a pencil of light in which the intensity thereof is uniformly distributed, a collective lens 178 which collects light emitted from the light tunnel 175, and an optical axis turning mirror 181 which turns the direction of the optical axis of a pencil of light emitted from the light tunnel 175 towards the image generating block 165.

The image generating block 165 has a collective lens 183, which functions as part of the light source side optical system 170, which collects the light source light which is reflected on the optical axis turning mirror 181 to the display element 51. Further, the image generating block 165 has a shining mirror 185 which shines the pencil of light which passes through the collective lens 183 to the display element 51 at a predetermined angle. Furthermore, the image generating block 165 includes a DMD which is the display element 51. A heat sink 190 is disposed between the display element 51 and the back side panel 13 for cooling the display element 51. Thus, the display element 51 is cooled by this heat sink 190. Additionally, a condenser lens 195, which functions as part of a projection side optical system 220, is disposed in proximity to the front of the display element 51.

The projection side block 168 has a group of lenses of the projection side optical system 220 which projects the "on" light which is reflected on the display element 51 on to the screen. This projection side optical system 220 includes a group of fixed lenses 225 which is incorporated in a fixed lens barrel. Further, the projection side optical system 220 includes a group of movable lenses 235 which is incorporated in a movable lens barrel. These groups of lenses are configured as a variable focus lens having a zooming function. The projection side block 168 is such that the group of movable lenses 235 is moved by a lens motor 45 for zooming and focusing.

Figure 4A:
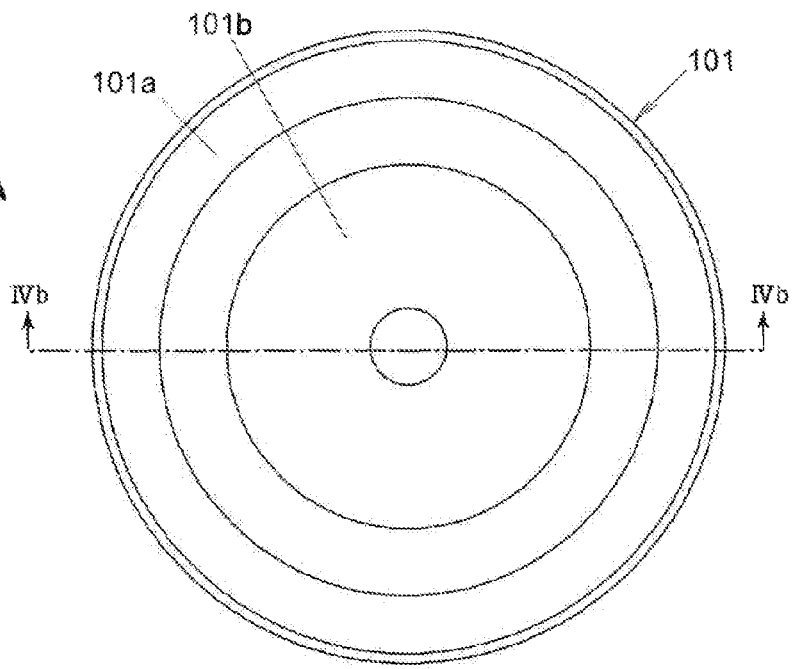
FIG. 4A is an exemplary plan view of a luminescent light emitting device according to the embodiment of the invention.
Figure 4B:
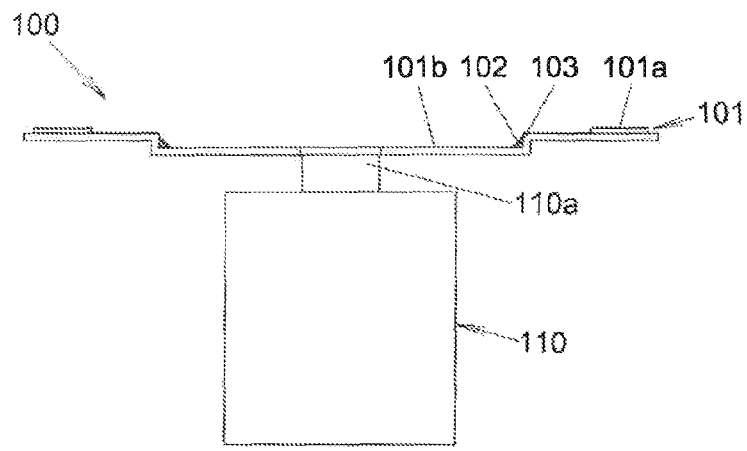
FIG. 4B is a sectional view of the luminescent light emitting device according to the embodiment of the invention which is taken along the line IVb-IVb in FIG. 4A.

Next, the construction of the luminescent wheel 101 which is a rotary wheel as a light source and a construction for stabilizing the rotational balance of the luminescent wheel 101 will be described by use of the drawings. When a luminescent material layer is laid over a surface of a luminescent light emitting area 101a of the luminescent wheel 101, there is a situation in which the rotational balance of the luminescent wheel 101 is impaired. It is considered that this is because the weight balance of the luminescent wheel 101 becomes uneven due to, for example, a laying error that occurs when the luminescent material layer is laid on the luminescent light emitting area 101a. FIGS. 4A, 4B are explanatory diagrams showing an example of a luminescent light emitting device which constitutes a light source device of the projector 10. FIG. 4A is a plan view of the luminescent light emitting device according to the embodiment of the invention. FIG. 4B is a sectional view of the luminescent light emitting device according to the embodiment of the invention which is taken along the line IVb-IVb in FIG. 4A.

As shown in FIG. 4A, the luminescent wheel 101 is a circular disc-shaped thin metallic base material having a thickness of about 0.5 mm. The annular luminescent light emitting area 101a is formed on the luminescent wheel 101, and this annular luminescent light emitting area 101a emits luminescent light of green wavelength band by employing light emitted from the excitation light sources 71 as excitation light. Thus, the luminescent wheel 101 functions as a luminescent plate which receives excitation light to emit luminescent light.

Additionally, the luminescent wheel 101 has a hole in the center thereof. Then, as shown in FIG. 4B, a motor shaft 110a of the wheel motor 110 is press fitted in the hole or is connected to the hole with an adhesive. Thus, the luminescent wheel 101 is a rotary wheel which is adapted to rotate together with the motor shaft 110a.

Additionally, in the luminescent wheel 101 of the invention, in connecting the luminescent wheel 101 with the motor shaft 110a of the wheel motor 110, the luminescent wheel 101 is held at a distal end of the motor shaft 110a, and a liquid reservoir is provided where an adhesive is placed which functions as a balance correction material for stabilizing the rotational balance of the luminescent wheel 101. Thus, the luminescent wheel 101 is designed so as to be fixed to the motor shaft 110a without employing a hub.

The luminescent wheel 101 of the invention has, as a liquid reservoir, an annular lowered step portion which is formed by bending part of the luminescent wheel 101 so as to be at right angle to the surface where the luminescent light emitting area 101a is formed. An adhesive 102 is placed in this annular step portion so as to stabilize the rotational balance of the luminescent wheel 101. Namely, the luminescent wheel 101 has the annular step portion which is formed at a different level from a reference plane which is a surface where the luminescent light emitting area 101a of the luminescent wheel 101 is formed. Additionally, this annular step portion includes a side wall portion 103 which is at right angle to the surface where the luminescent light emitting area 101a of the luminescent wheel is formed. It should be noted that in this embodiment, an acryl or epoxy based adhesive having a viscosity of 100 to 150 [Pa·s] is preferably used, but other adhesives may, of course, be used as the balance correction material.

The annular step portion is formed on an inner circumferential side of the luminescent light emitting area 101a and is provided so that the luminescent light emitting area 101a of the luminescent wheel 101 can constitutes a raised portion. Then, this annular step portion is an annular depressed or lowered front surface step portion 101b which is formed by depressing in whole a central area of the luminescent wheel which is defined within a predetermined radius on the inner circumferential side of the luminescent light emitting area 101a.

As a fabrication method of the front surface step portion 101b, the front surface step portion 101b can be formed simultaneously when an external shape of the metallic base material which is a base material of the luminescent wheel 101 is formed through mechanical work such as drawing or the like. In addition, the annular step portion of the embodiment is formed by bending part of the luminescent wheel 101 so as to be at right angle to the surface where the luminescent light emitting area 101a of the luminescent wheel 101 is formed. Namely, the annular step portion is formed so as to have the side wall portion 103 which is at right angle to the surface where the luminescent light emitting area 101a of the luminescent wheel 101 is formed. Because of this, the machining necessary to form the annular step portion becomes simple.

Figure 5:
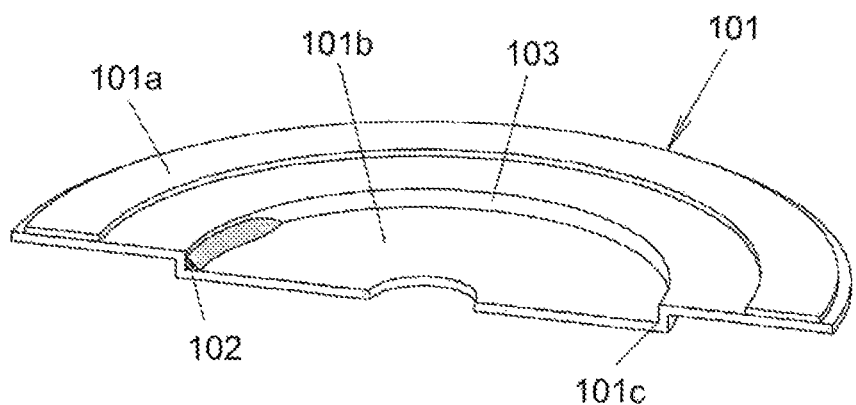
FIG. 5 is a perspective view of a luminescent wheel according to the embodiment of the invention.

In addition, as shown in FIG. 5, the adhesive 102 is placed in a corner 101c of the side wall portion 103 of the front surface step portion 101b, whereby even though the luminescent wheel 101 is rotated, it is possible to suppress by the side wall 103 the occurrence of a risk that the adhesive 102 is dislocated to thereby be scattered in a radial direction due to a centrifugal force generated by the rotation.

In this way, by adopting the construction in which the luminescent wheel 101 is held at the distal end of the rotating shaft 110a of the motor 110 without providing a hub and the liquid reservoir is provided for the placement of the adhesive so as to stabilize the rotational balance of the luminescent wheel 101, the weight of the light source device which includes the luminescent wheel 101 can be reduced, and the component costs can also be reduced.

Additionally, since the hub is not provided, the degree of freedom in design is increased in disposing a lens unit made up of the group of lenses 111 and the like which collects excitation light to the excitation light source side of the wheel with good efficiency.

The configuration of the annular step portion of the luminescent wheel which is designed so as to place the adhesive to stabilize the rotational balance of the luminescent wheel 101 is not limited to the front surface step portion which is formed at the different level from the surface where the luminescent light emitting area 101a is formed.

Figure 6A:
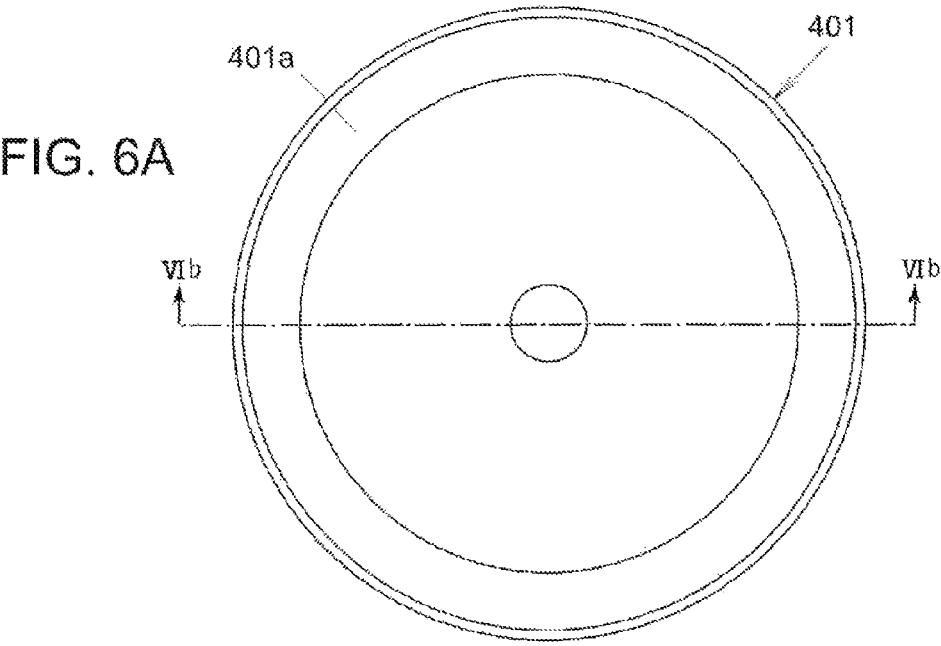
FIG. 6A is a plan view of a luminescent light emitting device of a modified example according to the embodiment of the invention.
Figure 6B:
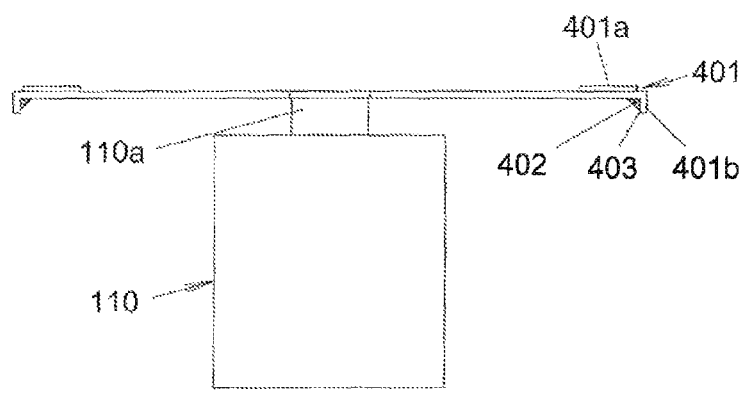
FIG. 6B is a sectional view of the luminescent light emitting device according to the embodiment of the invention which is taken along the line VIb-VIb in FIG. 6A.

FIG. 6A is a plan view of a luminescent light emitting device of a modified example according to the embodiment of the invention. FIG. 6B is a sectional view of the luminescent light emitting device according to the embodiment of the invention which is taken along the line VIb-VIb in FIG. 6A. An annular step portion of a luminescent wheel 401 of the modified example which is shown in FIGS. 6A and 6B is formed on an outer circumferential side of a luminescent light emitting area 401a. The annular step portion is an annular rear surface step portion 401b which is bent in an opposite direction to a side of the luminescent wheel 401 where the luminescent light emitting area is provided so as to be at right angle at a circumferential edge of the luminescent wheel 401. Additionally, in the luminescent wheel 401 of the modified example, an adhesive 402 which stabilizes the rotational balance of the luminescent wheel 401 is placed on the rear surface step portion 401b. Namely, the luminescent wheel 401 has the annular rear surface step portion 401b which is formed on the outer circumferential side of the luminescent light emitting area 401a of the luminescent wheel 401 along the circumferential edge of the luminescent wheel 401 which lies on the opposite side to the side of the luminescent wheel 401 where the luminescent light emitting area 401a thereof is provided. Additionally, the rear surface step portion 401b includes a side wall portion 403 which is at right angle to the surface on which the luminescent light emitting area 401a of the luminescent wheel 401 is formed.

As a fabrication method of the rear surface step portion 401b, the rear surface step portion 401b is formed simultaneously when an external shape of a metallic base material which is a base material of the luminescent wheel 401 is formed through mechanical work such as pressing or the like. In addition, the rear surface step portion 401 of the embodiment is formed by bending part of the luminescent wheel 401 so as to be at right angle to the surface of the luminescent wheel 401. Namely, the rear surface step portion 401b is formed so as to have the side wall portion 403 which is at right angle to the surface where the luminescent light emitting area 401a of the luminescent wheel 401 is formed. Thus, the machining to form the rear surface step portion 401b becomes simple.

Figure 7:
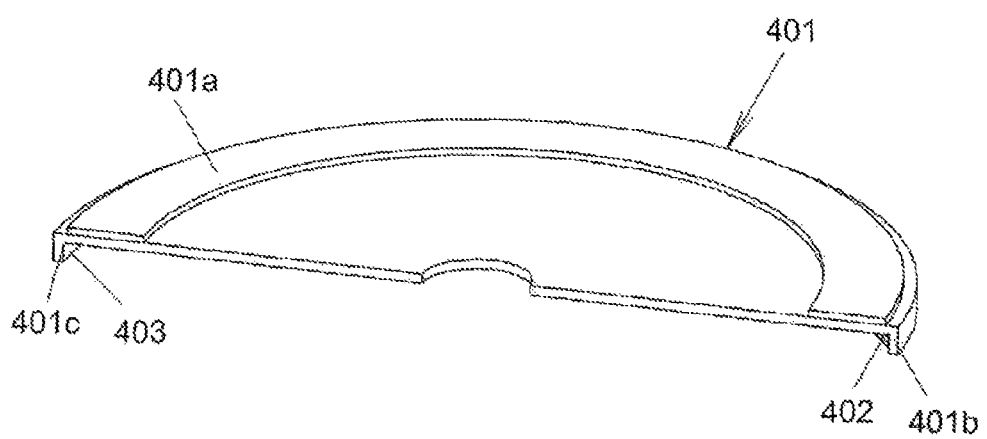
FIG. 7 is a perspective view of a luminescent wheel as a modified example according to the embodiment of the invention.

By placing the adhesive 402 which is the balance correction material in a corner 401c of the side wall portion 403 of the rear surface step portion 401b as shown in FIG. 7, even though the luminescent wheel 401 is rotated, it is possible to suppress by the side wall 403 the occurrence of a risk that the adhesive 402 is dislocated to thereby be scattered in a radial direction due to a centrifugal force generated.

It should be noted that there may be provided an annular step portion which has both a front surface step portion and a rear surface step portion like those described above. Specifically, an annular step portion of the luminescent wheel includes an annular front surface step portion which is formed along an inner circumferential side of the luminescent light emitting area and which is provided at a central portion of the luminescent wheel so as to define the raised luminescent light emitting area of the luminescent wheel. Further, the annular step portion of the luminescent wheel includes an annular rear surface step portion which is formed along an outer circumferential side of the luminescent light emitting area and which is bent at the circumferential edge of the luminescent wheel in an opposite direction to the surface of the luminescent wheel where the luminescent light emitting area thereof is formed so as to be at right angles to the surface. Namely, the annular step portion includes the annular front surface step portion which is formed along the inner circumferential side of the luminescent light emitting area and which is provided at the central portion of the luminescent wheel so as to define the raised luminescent light emitting area of the rotary wheel. Further, the annular step portion includes the annular rear surface step portion which is formed along the outer circumferential side of the luminous light emitting area and which is formed along the circumferential edge of the rotary wheel in the opposite direction to the surface where the luminous light emitting area of the rotary wheel is formed. In addition, the front surface step portion and the rear surface step portion include the side wall portions which are at right angles to the surface of the luminescent wheel where the luminous light emitting area thereof is formed.

As a fabrication method of these annular step portions, the annular step portions can be formed simultaneously with the formation of the external shape of the metallic base material which is the base material of the luminescent wheel through such machining work as drawing or pressing.

Additionally, the adhesive which stabilizes the rotational balance of the luminescent wheel is placed at the front surface step portion or the rear surface step portion. Specifically, the adhesive which stabilizes the rotational balance of the luminescent wheel is placed at the front surface step portion which is formed on the inner circumferential side of the luminescent light emitting area when the weight balance is slightly uneven in, for example, a weight balance controlling process for controlling the weight balance of the luminescent light emitting device, which will be described later. In addition, when the weight balance of the luminescent light emitting device is impaired largely, the adhesive is placed at the rear surface step portion which is formed on the outer circumferential side of the luminescent light emitting area. By so doing, the control of the rotational balance can be executed accurately.

In addition, as an annular step portion, a groove which constitutes a further depressed portion may be formed along a circumferential edge portion of the depressed portion of the front surface step portion which is formed on the inner circumferential side of the luminescent light emitting area. Namely, a height of a wall surface which extends vertically to the rear surface side from the light emitting area is made higher than a height from the front surface of the luminescent wheel where the luminescent light emitting area is formed to a front surface of the front surface step portion.

By so doing, since the height of the side wall portion of the annular step portion which constitutes the surface where the adhesive that is to be placed at the annular step portion is placed can be increased, it becomes possible to suppress by the side wall the occurrence of a risk that the adhesive is dislocated to thereby be scattered in a radial direction due to a centrifugal force generated when the luminescent wheel is rotated.

In forming the annular step portion on the luminescent wheel, when there are fears that strain is caused in the luminescent light emitting area of the luminescent wheel, an appropriate distance or space is preferably provided between the annular step portion and an inner edge of the luminescent light emitting area.

Incidentally, a calculation for correcting the center of gravity of the luminescent wheel was implemented as described below by making use of a simplified two-dimensional model, assuming that the outside diameter of the luminescent wheel is D, the density of the adhesive is ρ, and the radius of the adhesive is h (=the depth h of the annular step portion) (the size of the adhesive is assumed to be reduced to one fourth in size of a sphere by contacting the side wall and the bottom surface of the annular step portion).

The mass $m_b$ of the correction material is $$m_b = 4/3 \cdot \pi h^3 \cdot \rho \cdot 1/4 = \rho h^3 \cdot \rho/3 \qquad \text{(Equation 1)}$$

Assuming that gravitational acceleration is g, the moment $M_b$ of the correction material is $$M_b = Fl = m_b g \cdot d/2 \qquad \text{(Equation 2)}$$

Here, as a cause for losing the balance of the luminescent wheel, variation in thickness of the luminescent material due to an uneven application of the luminescent material or a deviation in the position where the luminescent material is placed are considered. Assuming that the moment then is $\Delta M_p$, the moment is expressed as follows, $$\Delta M_p = \Delta m_p g D/2 \qquad \text{(Equation 3)}$$

($\Delta m_p$: Varied mass due to an uneven application of the luminescent material)

The following relation only has to be established as a condition for reducing the degree of unbalance so that the center of the gravity of the luminescent wheel coincides with the axis of the luminescent wheel by balance correction.

$$\Delta m_p \le M_b \qquad \text{(Equation 4)}$$

Then, the following relation is induced from Equation 1 to Equation 4, $$\Delta m_p \cdot 3/\pi \cdot 1/\rho \le h^3 d/D \qquad \text{(Equation 5)}$$

Substituting $\Delta m_p \cdot 3/\pi \cdot 1/\rho$ by constant A, the following relation is induced from Equation 5, $$d \ge AD/h^3 \qquad \text{(Equation 6)}$$

When the center of gravity comes to be situated in the center of the luminescent wheel by these calculations, it is found out that d is inversely proportional to $h^3$ and is proportional to D.

In addition, the Equation 6 is transformed as follows, $$dh^3 \ge AD \qquad \text{(Equation 7)}$$

Then, the ranges of values on the outside diameter d of the annular step portion and the depth D of the annular step portion shall be considered hereinafter. Firstly the range of the value D which is an outside diameter of the luminescent wheel is described. When a diameter of a rotation axis of the motor is considered, the diameter of the luminescent wheel needs more than ϕ 10 mm including ϕ 10 mm. In addition, on considering an utilization to a projector which is used for mobile devices, the outside diameter of the luminescent wheel is made to be less than ϕ 60 mm including (ϕ 60 mm due to restrictions based on a size of a projector housing and the like. Therefore, the range of value D falls within from more than ϕ 10 mm including ϕ 10 mm to ϕ 60 mm including ϕ 60 mm.

Next, the range of a value of constant A shall be considered. The constant A, as described above, is represented as follows, $$\Delta m_p \cdot 3/\pi \cdot 1/\rho$$

Thus, if ranges of values of $\Delta m_p$ and ρ are determined, the range of a vale of constant A is necessarily determined.

A range of a value of the density ρ of the adhesive for adjusting a balance is made to be from 0.001 g/mm³ which is the density of an ordinary adhesive which is commercially available to 0.0025 g/mm³ which is the density of a particular adhesive used for adjusting a balance.

In addition, a range of a value of $\Delta m_p$ is made to be from 0.001 g to 0.01 g, because a weight of a luminescent material portion per a piece of the luminescent wheel is approximately 0.1 g and a change of mass due to an uneven application of the luminescent material and the like is from one hundredth (1/100) to one tenth (1/10) of mass of the luminescent material portion.

Since ranges of values of ρ and $\Delta m_p$ is determined as above described, a range of a value of the constant A is determined accordingly. Thus, a range of a value of the constant A is made to be from more than 0.38 mm³ including 0.38 mm³ to less than 9.55 mm³ including 9.55 mm³.

Since a range of a value of A and D is determined as described above, a range of a value of $dh^3$ is determined as described below, $$3.8 \le dh^3 \le 578 (\text{mm}^4) \qquad \text{(Equation 8)}$$

When the outside diameter d and the depth h of the annular step portion is set as the Equation 8 being satisfied and the annular step portion is formed on the luminescent wheel 101 accordingly, the adhesive can be placed in an ensured fashion which can keep the balance of the luminescent wheel. It should be noted that the front surface step portion 101b and the rear surface step portion 401b can be provided by employing the relation above. Additionally, since the rear surface step portion 401 can be formed further circumferentially outwards than the front surface step portion 101b, it is seen from Equation 6 that the amount of the adhesive can be reduced. Consequently, the depth of the rear surface step portion can be made shallower than the depth of the front surface step portion.

Figure 8:
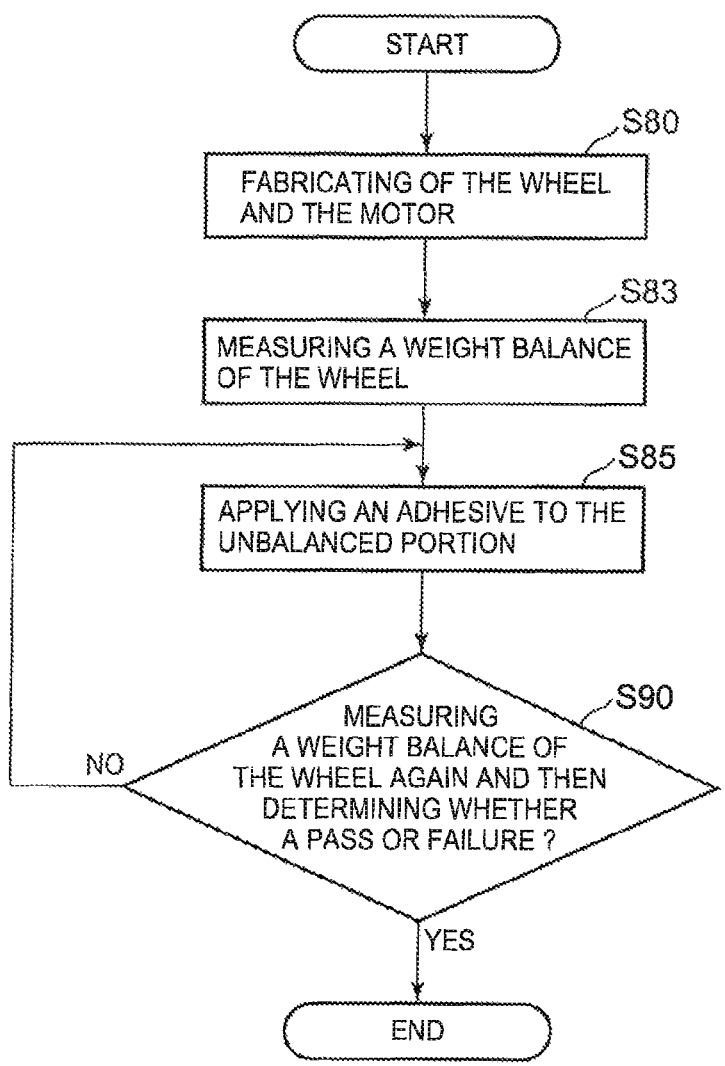
FIG. 8 is a flowchart of a controlling process for controlling a weight balance of the luminescent light emitting unit according to the embodiment of the invention.

Next, the flow of a weight balance controlling process for stabilizing the rotational balance of the luminescent light emitting device 100 having the rotary wheel will be described by use of the drawing. FIG. 8 is a flowchart of a weight balance controlling process for controlling the weight balance of the luminescent light emitting device 100 which is the light source device 80 of the projector 10. The luminescent wheel that will be described below in relation to the weight balance controlling process for the luminescent light emitting device 100 is the luminescent wheel which has the front surface step portion 101b.

Firstly, in fabricating the luminescent light emitting device 100, an assembling step is performed in which the motor shaft 110a of the wheel motor 110 is press fitted in the hole in the luminescent wheel 101 which is the rotary wheel or/and the motor shaft 110a of the wheel motor 10 is connected with the hole by the adhesive for integration of the luminescent wheel 101 with the motor shaft 110a (step S80).

Next, a measuring step of measuring a weight balance of the wheel is performed as a weight balance controlling step so as to stabilize the rotational balance of the luminescent light emitting device 100 in which the luminescent wheel 101 and the wheel motor 110 are integrated together (step S83).

A controlling device for measuring a weight balance of the wheel is such as to measure a rotational fluctuation in rotating speed by rotating the wheel to thereby determine a range on the circular disc-shaped wheel where the weight balance is lighter than those in other ranges so as to identify an unbalanced portion.

Next, an adhesive application step is performed in which the adhesive 102 is applied to the unbalanced portion which is identified by the controlling device so as to make the weight balance even (step S85).

Then, a pass/failure determination is made by rotating again the luminescent light emitting device 100 in which the weight balance is made even by applying the adhesive 102 by the controlling device for measurement of the weight balance of the wheel (step S90).

In the event that it is determined as pass in the pass/failure determination (step S90) as a result of the weight balance of the wheel being even, the controlling process ends. On the contrary, in the event that it is determined in the pass/failure determination (step S90) that the weight balance of the wheel being uneven, the process flow returns to the adhesive application step (step S85) for application of the adhesive 102 to the unbalanced portion which is freshly detected at this time to make the weight balance even.

Thus, as has been described heretofore, according to the embodiment, it is possible to provide the rotary wheel which can reduce the size and weight while suppressing the generation of vibrations by adjusting preferably the weight of the rotary wheel without using such a member as a hub and the component cost of the rotary wheel, as well as the fabrication cost that is incurred in assembling the rotary wheel. Additionally, it is possible to provide the light source unit which employs the rotary wheel, the projector 10 which employs the light source unit and the rotary wheel fabrication method.

Further, according to the embodiment, since no hub is provided, the degree of freedom in design is increased in disposing the lens unit made up of the group of lenses 111 which collects excitation light to the excitation light source side of the wheel with good efficiency.

Additionally, according to the embodiment, since the adhesive 102 is made to be placed at the front surface step portion 101b which lies in the vicinity of the center of the surface side of the rotary wheel where the luminescent material is provided, the adhesive 102 can easily be applied to the front surface step portion 101b from the front side of the rotary wheel.

Additionally, according to the embodiment, since the adhesive 402 is made to be placed at the rear surface step portion 401b, even in the event that the adhesive 402 comes off while the rotary wheel is rotating, there is caused no such situation that the adhesive 402 is scattered to the luminescent material which is situated on the opposite surface side.

Further, according to the embodiment, since the adhesive is made to be placed at the front surface step portion or/and the rear surface step portion, in the weight balance controlling process for the luminescent light emitting device 100, when the weight balance is slightly uneven, the adhesive is placed at the front surface step portion, whereas when the weight balance is impaired largely, the adhesive is placed at the rear surface step portion. By adopting this configuration, the weight balance control can be executed accurately.

In addition, according to the embodiment, as the fabrication method of the rotary wheel, the annular step portion where the adhesive is placed can be formed through such mechanical work as drawing or pressing at the same time as the circular disc-shaped base plate is subjected to mechanical work. Therefore, the component cost can be reduced.

In this embodiment, while the rotary wheel is formed by use of the metallic base material as the base plate in view of heat dissipating properties and cost, the invention is not limited to that rotary wheel, and hence, it is possible to use a base plate which is formed of a different material such as a resin having high heat conductivity or a ceramic having high heat conductivity. Thus, a rotary wheel may be formed by employing the base material which is formed of such a different material so as to include an annular step portion which is formed at a different level from a reference plane which is a surface where a luminescent light emitting area is formed.

Additionally, the luminescent wheel of the embodiment has the annular step portion which is bent so as to be at right angles to the surface of the luminescent wheel where the luminescent light emitting area thereof is formed. However, in the event that the adhesive does not come off and are not scattered in the radial direction even when the centrifugal force is applied thereto as a result of rotation of the luminescent wheel, the annular step portion may be formed by bending the luminescent wheel at a predetermined angle other than a right angle relative to the reference plane which is the surface of the luminescent wheel where the luminescent light emitting area thereof is formed.

In addition, the values of both the outside diameter d and depth h of the annular step portion are not limited to those described in the embodiment and hence vary depending on conditions such as the degree of unevenness in applied luminescent material in the luminescent material layer, the specific weight of the balance correction material such as the adhesive to be applied, limitation imposed on the shape of the projector product, and combination in shape with other components. Consequently, there may be a possibility that an appropriate shape for the step portion varies accordingly as the aforesaid conditions vary.

Additional advantages and modifications will readily occur to those skilled in the art to which the invention pertains. Therefore, the invention in its broader aspects is not limited to the specific details and representative embodiment shown and described herein. Accordingly, various modifications may be made without departing from the spirit and scope of the general inventive concept as defined by the appended claims and their equivalents.

What is claimed is:

1. A rotary wheel having a circular disc shape, comprising:
 a luminescent light emitting area in which a luminescent material is provided along a circumferential edge of the circular disc shape;
 an annular step portion which is formed at a different level from a reference plane which is a surface where the luminescent light emitting area is formed; and
 a balance correction material which is placed at the annular step portion,
 wherein the annular step portion comprises an annular rear surface step portion which is formed along the circumferential edge of the circular disc shape on an opposite side of the rotary wheel from a side of the surface where the luminescent light emitting area is provided,
 wherein the rear surface step portion is formed on an outer circumferential side of the luminescent light emitting area, and
 wherein the balance correction material is placed at the annular rear surface step portion so as to even a rotational balance when the rotary wheel is rotated.

2. A rotary wheel as set forth in claim 1, wherein the annular step portion further comprises an annular front surface step portion which is provided at a center of the rotary wheel so that the luminescent light emitting area is defined as a raised portion, and
 wherein the front surface step portion is formed on an inner circumferential side of the luminescent light emitting area.

3. A rotary wheel as set forth in claim 1, wherein when an outside diameter of the annular step portion is made d and a depth of the annular step portion is h, the outside diameter of the annular step portion and the depth of the annular step portion are set such that the following relationship is satisfied:

$$3.8 \leq dh^3 \leq 578 (mm^4)$$

4. A rotary wheel as set forth in claim 1, wherein the annular step portion has a side wall portion which is at a right angle to the surface of the rotary wheel where the luminescent light emitting area is formed.

5. A rotary wheel as set forth in claim 1, wherein the rotary wheel is a thin plate which is formed of a metal.

6. A rotary wheel as set forth in claim 1, wherein the balance correction material is an adhesive.

7. A light source unit comprising:
the rotary wheel set forth in claim 1;
an excitation light source which shines light on to the rotary wheel; and
a wheel motor which is connected to the rotary wheel to rotate the rotary wheel.

8. A light source unit comprising:
the rotary wheel set forth in claim 2;
an excitation light source which shines light on to the rotary wheel; and
a wheel motor which is connected to the rotary wheel to rotate the rotary wheel.

9. A projector comprising:
a light source unit;
a display element;
a light source side optical system which guides light from the light source unit to the display element;
a projection side optical system which projects an image emitted from the display element on to a screen; and
a projector control unit which controls the light source unit and the display element,
wherein the light source unit is the light source unit set forth in claim 7 which comprises, as a plurality of light sources, a light source which emits light of a red wavelength band, a light source which emits light of a blue wavelength band, and a light source which emits light of a green wavelength band.

10. A projector comprising:
a light source unit;
a display element;
a light source side optical system which guides light from the light source unit to the display element;
a projection side optical system which projects an image emitted from the display element on to a screen; and
a projector control unit which controls the light source unit and the display element,
wherein the light source unit is the light source unit set forth in claim 8 which comprises, as a plurality of light sources, a light source which emits light of a red wavelength band, a light source which emits light of a blue wavelength band and a light source which emits light of a green wavelength band.

11. A rotary wheel having a circular disc shape, comprising:
a luminescent light emitting area in which a luminescent material is provided along a circumferential edge of the circular disc shape;
an annular step portion which is formed at a different level from a reference plane which is a surface where the luminescent light emitting area is formed; and
a balance correction material which is placed at the annular step portion,
wherein the annular step portion comprises (i) an annular front surface step portion which is provided at a center of the rotary wheel so that the luminescent light emitting area is defined as a raised portion, and (ii) an annular rear surface step portion which is formed along the circumferential edge of the circular disc shape on an opposite side of the rotary wheel from a side of the surface where the luminescent light emitting area is provided, and
wherein the balance correction material is placed at the front surface step portion or the rear surface step portion so as to even a rotational balance when the rotary wheel is rotated.

12. A rotary wheel as set forth in claim 11, wherein the front surface step portion is formed on an inner circumferential side of the luminescent light emitting area, and
wherein the rear surface step portion is formed on an outer circumferential side of the luminescent light emitting area.

13. A light source unit comprising:
the rotary wheel set forth in Claim 11;
an excitation light source which shines light on to the rotary wheel; and
a wheel motor which is connected to the rotary wheel to rotate the rotary wheel.

14. A projector comprising:
a light source unit;
a display element;
a light source side optical system which guides light from the light source unit to the display element;
a projection side optical system which projects an image emitted from the display element on to a screen; and
a projector control unit which controls the light source unit and the display element,
wherein the light source unit is the light source unit set forth in claim 13 which comprises, as a plurality of light sources, a light source which emits light of a red wavelength band, a light source which emits light of a blue wavelength band and a light source which emits light of a green wavelength band.

15. A rotary wheel fabrication method for forming a thin metallic base plate into a circular disc shape through mechanical work,
wherein the rotary wheel comprises:
a luminescent light emitting area in which a luminescent material is provided along a circumferential edge of the circular disc shape;
an annular step portion which is formed at a different level from a reference plane which is a surface where the luminescent light emitting area of the rotary wheel is formed; and
a balance correction material which is placed at the annular step portion, and
wherein the annular step portion is formed by bending the rotary wheel by a predetermine angle relative to the reference plane which is the surface where the luminescent light emitting area of the rotary wheel is formed when the base plate is formed into the circular disc shape through mechanical work.

16. A rotary wheel fabrication method as set forth in claim 15, wherein the annular step portion has a side wall portion which is at a right angle to the surface, which is flat, where the luminescent light emitting area of the rotary wheel is formed.

* * * * *